UNITED STATES PATENT OFFICE.

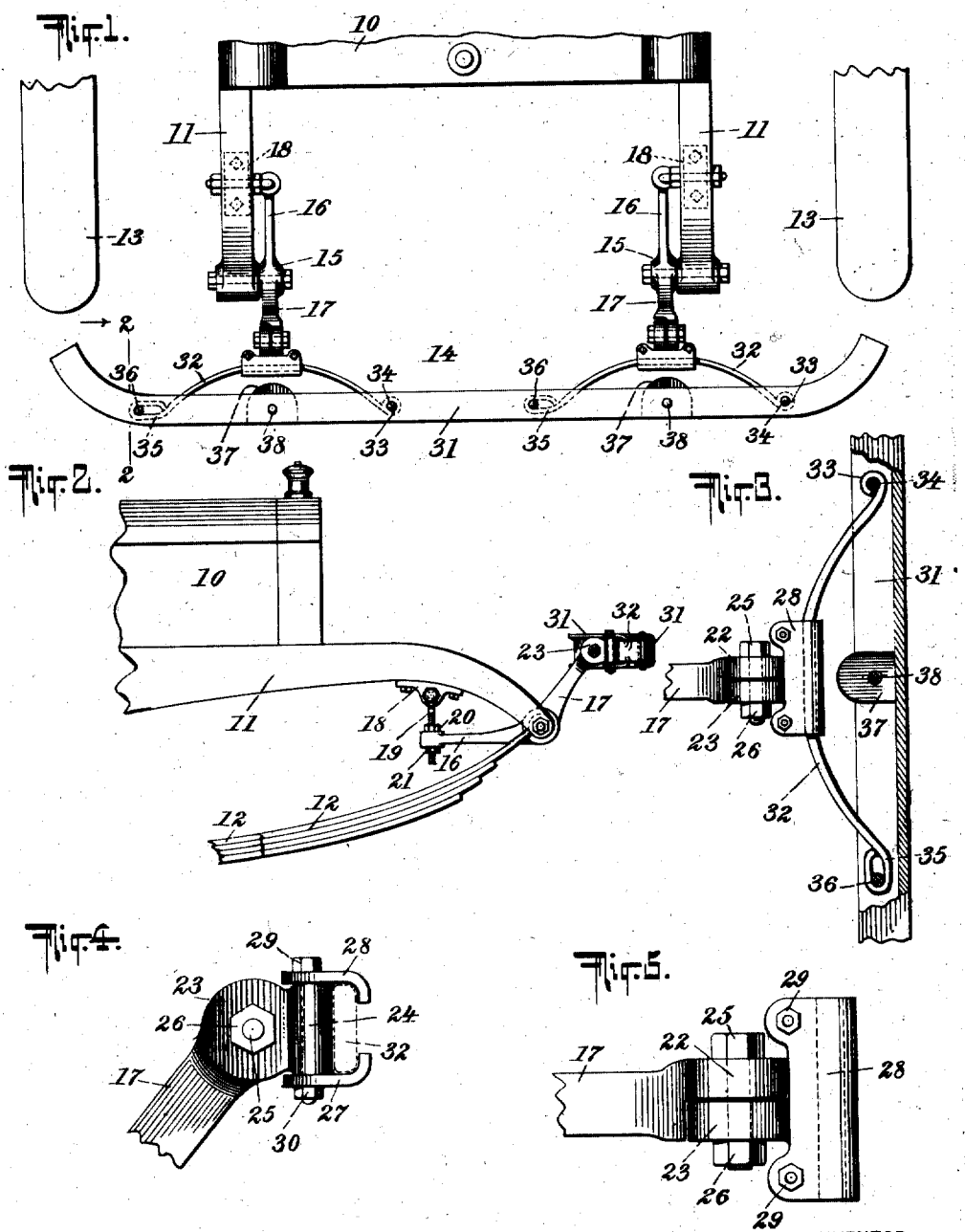

EDWIN K. CONOVER, OF PATERSON, NEW JERSEY.

FENDER FOR MOTOR-VEHICLES.

1,000,668.

Specification of Letters Patent. Patented Aug. 15, 1911.

Application filed June 16, 1910. Serial No. 567,151.

*To all whom it may concern:*

Be it known that I, EDWIN K. CONOVER, a citizen of the United States, residing at Paterson, Passaic county, in the State of New Jersey, have invented certain new and useful Improvements in Fenders for Motor-Vehicles, of which the following is a full, clear, and exact description.

My invention relates to improvements in buffing apparatus for vehicles, and the same has for its object more particularly to provide a simple, efficient and reliable apparatus which may be readily applied to a vehicle for the purpose of neutralizing the shock produced by the impact of the vehicle with an object.

Further, said invention has for its object to provide a buffing apparatus which may be readily secured to a vehicle, and adjusted to the desired position thereon.

Further, said invention has for its object to provide a buffing apparatus in which the member or part, which contacts with an object, is yieldingly secured to the bracket or member whereby the same is secured to the vehicle.

Further, said invention has for its object to provide a buffing apparatus in which the member or part which is adapted to contact with an object is provided with means for initially absorbing the shock, and additional means for subsequently yieldingly resisting or gradually arresting the movement of said member or part.

To the attainment of the aforesaid objects, my invention consists in the novel details of construction, and in the combination, connection and arrangement of parts hereinafter more fully described and then pointed out in the claims.

In the accompanying drawings, wherein like numerals of reference indicate like parts, Figure 1 is a top or plan view showing the forward position of a motor vehicle with a bumper constructed according to, and embodying my said invention, applied thereto; Fig. 2 is a section on the line 2—2 of Fig. 1; Fig. 3 is an enlarged detail top view, partly in section, showing a portion of the fender bar, and one of the yielding supports therefor, and Figs. 4 and 5 are enlarged detail side and plan views, respectively, showing one of the clamping members.

In said drawings, 10 designates the forward end of a motor vehicle, and 11, 11 the projecting ends of the side-members of the frame to which are secured the forward ends of the springs 12, 12 supporting the body and operating parts of the vehicle.
13, 13 denote the forward wheels of the vehicle. 14 denotes the bumper comprising brackets 15 15 each composed of a horizontal member 16, and an upwardly and forwardly inclined member 17. The brackets 15 15 are secured at the junction of their horizontal and inclined members to the ends of said frame members 11, 11. Upon the under side of each frame member 11, 11, directly above the rear ends of the horizontal bracket-members 16, is secured a bearing 18, in which is pivotally secured the threaded horizontal member of an angular supporting rod or adjusting screw 19. The lower end of the vertical member of said angular supporting rod or adjusting screw is also threaded and passes through an opening in the rear end of the horizontal member of the bracket 16, and provided with adjusting nuts 20 21 above and below the end of said horizontal member for securing the bracket to its adjusted position.

The outer ends of the inclined members 17, 17 are provided with circular heads 22, 22 to which are adjustably secured the corresponding heads 23 23 of clamping blocks 24, 24, by means of bolts 25, and nuts 26. The clamping blocks 24 24, are each provided at their lower edges with an integral jaw formed by a horizontally projecting flange 27, having its forward edge turned upwardly, and at their upper ends said blocks are each provided with a removable jaw 27 having its forward edge turned downwardly. The jaws 28 are secured to the blocks 24 by bolts 29 and nuts 30.

31 denotes a fender bar preferably made of channel iron, and having its ends rounded and extending rearwardly, and terminating adjacent to the front wheels 11, 11.
32, 32 denote curved or semi-elliptical springs secured midway between their ends within the jaws 27 and 28 of the clamping blocks 24, 24, which springs serve to take up or absorb the initial shock received by the fender bar. The corresponding ends of the springs 32, 32 are curled to form eyes 33, 33 to receive pins 34, 34 which extend vertically through the horizontal flanges of the fender bar 31, and the other ends of no said springs are bent to form elongated openings or loops 35, 35 to receive pins 36, 36 which also extend through the horizontal flanges of said fender bar.

Upon the rear side of the fender bar directly in front of the clamping blocks 24, 24 are secured cushions 37, 37 made of rubber or other suitable material which serve as supplemental means for absorbing the final shock received by the fender bar and arresting the movement thereof. The said cushions 37, 37 are secured intermediate the horizontal flanges of said fender bar 31 by pins 38, 38 extending through said flanges and cushions.

The operation of the apparatus is as follows: After the apparatus has been applied to the vehicle, it merely becomes necessary to raise or lower the rear ends of the horizontal members 16, 16 of the brackets 15, 15 upon the supporting rods or adjusting screws 19, 19, in order to bring the clamping blocks at the ends of the inclined members 17, 17 to the desired height. Hereupon the nuts 26, 26 on the bolts 25, 25, which secure the clamping blocks 24, 24 to the brackets 15, 15 are loosened, and said brackets adjusted to a horizontal position. Should the vehicle strike an obstacle in its path the buffer bar 31 will receive the impact or shock and its rearward movement be resisted initially by the action of springs 32, 32. Should the impact be of sufficient force to wholly overcome the resisting power of the springs 32, 32 then the forward portions of said spring secured within the clamping blocks 24, 24 will be caused to contact with the elastic cushions 37, 37 secured upon said bar, and resist the further movement of said bar, and finally arrest its movement.

Having thus described my invention what I claim, and desire to secure by Letters Patent, is:—

1. The combination with a vehicle, of a fender comprising a buffer bar, a plurality of pivoted supports, means for adjusting said pivoted supports, clamps pivotally mounted on said supports, means for adjusting said clamps, and resilient members secured to said clamps and to said buffer bar, substantially as specified.

2. The combination with a vehicle, of a fender comprising a buffer bar, a plurality of pivoted supports secured to said vehicle, clamping members secured to said pivoted supports, and springs secured within said clamping members and to said buffer bar adjacent to the opposite ends thereof, substantially as specified.

3. The combination with a vehicle, of a fender comprising a buffer bar, a plurality of brackets pivotally secured to said vehicle, means for securing said brackets in their adjusted positions, clamping members on said brackets, and springs secured intermediate their ends to said clamping members and at their ends to said buffer bar, substantially as specified.

4. The combination with a vehicle, of a fender comprising a buffer bar, a plurality of brackets pivotally secured intermediate their ends to said vehicle, means for securing the same in their adjusted positions, clamping members adjustably secured to said pivoted brackets, and springs secured intermediate their ends to said brackets, and secured at their ends to said buffer bar, so as to be movable relatively thereto, substantially as specified.

5. The combination with a vehicle, of a fender comprising a buffer bar, a plurality of brackets pivotally secured intermediate their ends to said vehicle, means securing the same in their adjusted positions, clamping members adjustably secured to said pivoted brackets, springs secured to said brackets and buffer bar, and resilient cushioning members disposed intermediate of said clamping members and buffer bar, substantially as specified.

6. The combination with a vehicle, of a fender comprising a buffer bar, a plurality of brackets pivotally secured intermediate their ends to said vehicle, adjusting screws secured to said vehicle and traversing corresponding ends of said pivoted brackets, nuts arranged upon said adjusting screws above and below said pivoted brackets for securing the same to their adjusted positions, clamping members pivotally mounted upon the opposite ends of said brackets, means for securing said clamping members to their adjusted positions, and springs secured intermediate their ends to said clamping members, each of said springs having one of its ends secured to said buffer bar so as to be movable longitudinally of said buffer bar, substantially as specified.

7. The combination with a vehicle, of a fender comprising a buffer bar, a plurality of brackets pivotally secured intermediate their end to said vehicle, adjusting screws secured to said frame and traversing the inner ends of said pivoted brackets, nuts arranged upon said adjusting screws above and below said pivoted brackets for securing the same to their adjusted positions, clamping members pivotally secured to the opposite ends of said brackets, means for securing said clamping members to their adjusted positions, springs secured intermediate their ends to said clamping members and movable longitudinally of said buffer bar, and elastic cushions secured upon said buffer bar adapted to engage with said clamping members, substantially as specified.

8. The combination with a vehicle having a pair of parallel side frame members, of a fender comprising a buffer bar, a pair of brackets pivotally secured to said side frame members, bearings secured to said side frame members, screws supported in said bearings and traversing the inner ends of said brackets, adjusting nuts on said screws for securing said brackets to their adjusted positions, heads pivotally secured upon the outer ends of said brackets, means for securing said heads to their adjusted positions, clamping jaws on said heads, curved springs secured intermediate their ends within the clamping jaws on said heads, and each of said springs having an eye at one of its ends and secured to said buffer bar; and an elongated opening at its other end to receive a pin for movably attaching said end to said buffer bar, substantially as specified.

9. The combination with a vehicle having a pair of parallel side frame members, of a fender comprising a buffer bar, a pair of brackets pivotally secured to said side frame members, bearings secured to said side frame members, screws pivotally supported in said bearings each traversing one end of said brackets, adjusting nuts on said screws for securing said brackets to their adjusted positions, heads pivotally secured upon the outer ends of said brackets, means for securing said heads to their adjusted positions, clamping jaws on said heads, and curved springs secured intermediate their ends within the clamping jaws on said heads, each of said springs having an eye at one of its ends and secured to said buffer bar, and an elongated opening at its other end for securing said end of the spring to said buffer bar so as to be movable longitudinally thereof, and an elastic cushion secured upon said buffer bar intermediate the ends of said springs, substantially as specified.

10. The combination with a vehicle of a fender comprising a U-shaped buffer bar having its open portion facing inward, supporting means, and springs secured upon said supporting means having their ends secured within said U-shaped buffer bar for yieldingly supporting the same, substantially as specified.

Signed at the city of New York, in the county and State of New York, this 28th day of May, nineteen hundred and ten.

EDWIN K. CONOVER.

Witnesses:
CONRAD A. DIETRICH,
JOSEPH G. QUINN, Jr.